A. T. JACOBSSON.
MOTION PICTURE SCREEN AND PROCESS FOR MAKING THE SAME.
APPLICATION FILED APR. 20, 1916.

1,204,775.

Patented Nov. 14, 1916.

INVENTOR
Axel T. Jacobsson

Morsell, Keeney & French
ATTORNEYS

UNITED STATES PATENT OFFICE.

AXEL T. JACOBSSON, OF MILWAUKEE, WISCONSIN.

MOTION-PICTURE SCREEN AND PROCESS FOR MAKING THE SAME.

1,204,775.

Specification of Letters Patent. Patented Nov. 14, 1916.

Application filed April 20, 1916. Serial No. 92,534.

*To all whom it may concern:*

Be it known that I, AXEL T. JACOBSSON, a subject of the King of Sweden, and resident of Milwaukee, in the county of Milwaukee and State of Wisconsin, have invented new and useful Improvements in Motion-Picture Screens and Processes for Making the Same, of which the following is a description, reference being had to the accompanying drawings, which are a part of this specification.

The invention relates to screens upon which motion pictures and the like are exhibited and to a process for making the screen.

The invention is designed more particularly to provide a screen of the character described which will be practically pure white and which may be readily washed and cleaned.

Figure 1:
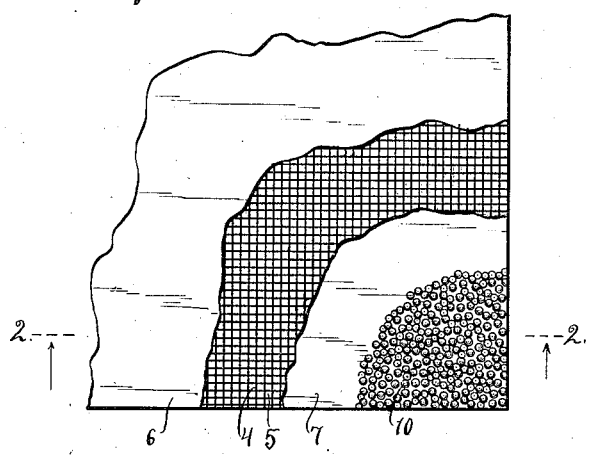
Figure 2:
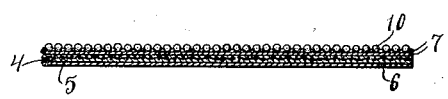
Figure 3:
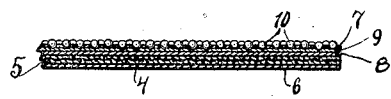

In the drawings: Figure 1 is a view of a portion of the screen, parts being broken away to show the different coatings applied to the screen; Fig. 2 is a section taken on the line 2—2 of Fig. 1; Fig. 3 is a section similar of Fig. 2 showing a modified form of screen.

The invention consists in the several steps of the process hereinafter set forth and the product resulting therefrom and is more particularly defined by claims at the conclusion hereof.

Broadly stated, the screen consists of a suitable back or body having an adhesive dressing applied thereto and a layer of small glass globules applied to the adhesive dressing and the process consists in preparing the back or body, preparing and applying small glass globules to the adhesive dressing.

The back or body is prepared as follows:—A suitable filler 5 is added to any suitable pliable fabric 4 or other material. The fabric which I preferably employ is canvas which is stretched upon a wooden frame so that the different coatings may be applied thereto. Previous to the applying of the filler, if desired, a coating of fireproof composition is applied to the canvas. I have found that a coating of "pyrolin" will render the canvas fireproof. After the coating of pyrolin is dry the canvas or other material is coated with a filler above referred to.

The filler which I preferably employ consists of a mixture of pipe clay, spar varnish, Japan drier and turpentine. These ingredients are mixed in the following proportions: to five pounds of pipe clay I add one-quart of spar varnish, one-eighth of a gallon of Japan drier, and three gallons of turpentine. After the canvas has been covered with the filler, the turpentine will evaporate and leave the composition of pipe clay, varnish and Japan drier upon the canvas or screen. The object of applying this preparation is, of course, to fill up the pores of the material which in the present instance is the mesh of the cloth and to so fill them up that the canvas will become smooth and flexible so that the screen or curtain may be raised and lowered without liability of breaking or cracking. To the back of the canvas, I apply a black or opaque coating 6 and I have found that a coating of pyrolin containing graphite is suitable for this purpose as it not only prevents the light from filtering through the screen, but renders the curtain fireproof. When the filler has dried on the screen, the next step consists in applying the various coatings, consisting of the adhesive dressing to the front side of the screen. This adhesive dressing consists of one or several coatings 7 of a white solid or metallic base ground in poppy oil and a solvent, such as turpentine.

The base which I preferably employ is French zinc. The French zinc, poppy oil and turpentine are mixed together in any suitable proportions and I have found that a mixture containing one-third each of the above named ingredients or one-half French zinc to one-quarter each of poppy oil and turpentine will be suitable for this purpose. This coating or coatings is designed to render the screen pure white and to provide an adhesive dressing for the purpose hereinafter described. For the purpose of economy I may cover the previously filled dried screen first with a coating 8 of a composition of dry white lead ground in poppy seed oil or poppy oil and after this dries the screen is covered with a coating 9 of a composition of flake white ground in poppy oil and turpentine and applying these previous to the coatings of French zinc, poppy oil and turpentine above described. The addition of these coatings of white lead and flake white above described reduce the cost of manufacture of the screen as it is not necessary to apply as much of the French zinc composition to the screen when they are used, but these coatings may be dispensed with if sufficient French zinc, poppy oil, and turpentine are applied and as many coatings may be applied as are deemed necessary.

The coatings previously described act as plastic adhesive agents. The use of the poppy oil in the above described compositions is of importance as it will render the screen a pure white that will hold its color and will not turn yellow.

The next step of the process consists in applying to the adhesive dressing a layer 10 of small glass globules. I prefer to use for this purpose minute round glass pearls known as Ballontino. These pearls are first treated with hydrofluoric acid to remove their polish and give them a dull snow-white color and then thoroughly rinsed or cleaned with water and dried. These fluorized pearls will give to the screen a dull snow-white finish which is easy to the eye and will therefore prevent eye-strain. The pearls are applied to the screen before the adhesive dressing becomes dry in any suitable manner and the way in which I apply them is to sift them over the dressed screen and thus partly embed them in the adhesive coating.

A screen prepared as above described will be highly efficient as furnishing a clear pure white background upon which to exhibit motion pictures or lantern slide pictures and it can be washed with soda, soap and water without injury.

What I claim as my invention is:

1. A screen for exhibiting motion pictures consisting of a piece of fabric coated with pyrolin and a filler to form a flexible fireproof backing, said backing having an adhesive dressing applied thereto, and a layer of small glass pearls partially embedded in said dressing.

2. A screen for exhibiting motion pictures and the like consisting of a suitable back having an adhesive dressing applied thereto, and a layer of minute fluorized glass globules applied to said dressing.

3. A screen for exhibiting motion pictures and the like consisting of a pliable fireproof body portion having an opaque back and an adhesive dressing applied to the front surface of said body portion, and a layer of small fluorized glass globules applied to said dressing.

4. A screen for exhibiting motion pictures and the like consisting of a canvas back coated with a filler and having an adhesive dressing applied thereto, and a layer of small fluorized glass globules applied to said dressing.

5. A screen for exhibiting motion pictures and the like consisting of a suitable back having an adhesive dressing consisting of a composition of a ground white solid base mixed with poppy oil and a solvent applied thereto, and a layer of small glass globules applied to said dressing.

6. A screen for exhibiting motion pictures and the like consisting of a fabric body portion coated with a filler and having an opaque back, an adhesive dressing consisting of a composition of a ground white solid base mixed with poppy oil and a solvent applied to the front surface of said body portion, and a layer of small glass globules applied to said dressing.

7. A screen for exhibiting motion pictures and the like consisting of a fabric back coated with a filler and having an adhesive dressing consisting of a composition of French zinc, poppy oil and a solvent applied thereto, and a layer of small glass globules applied to said dressing.

8. A screen for exhibiting motion pictures and the like consisting of a fabric back coated with a filler and having an adhesive dressing consisting of a composition of French zinc, poppy oil, and a solvent applied thereto, and a layer of small fluorized glass globules applied to said dressing.

9. A screen for exhibiting motion pictures and the like consisting of a pliable fireproof back having an adhesive dressing of a composition of French zinc, poppy oil and a solvent applied thereto, and a layer of small fluorized Ballontino pearls applied to said dressing.

10. A screen for exhibiting motion pictures consisting of a piece of fabric coated with a filler consisting of pipe clay, varnish, Japan drier and a suitable solvent to form a flexible backing, said backing having an adhesive dressing applied thereto, and a layer of small glass pearls applied to said dressing.

11. A screen for exhibiting motion pictures consisting of a piece of fabric coated with a filler consisting of pipe clay, varnish, Japan drier, and a solvent to form a flexible backing, said backing having an adhesive dressing of a composition of French zinc, poppy oil, and a solvent applied thereto, and a layer of small glass pearls applied to said dressing.

12. The process of making a screen or curtain for motion pictures which consists in applying a fireproof composition coating to a piece of canvas and allowing it to dry thereon, then applying a filler to the canvas to render it smooth and pliable and allowing it to dry thereon, then applying one or more coats of an adhesive pure white composition to the canvas, and then sifting over this white coating before it dries a layer of small glass globules.

13. The process of making a screen for motion pictures which consists in coating a suitable base with an adhesive dressing, treating small glass globules with hydrofluoric acid to render them a dull white to relieve eyestrain, and applying these fluorized pearls to said dressing before it dries.

In testimony whereof, I affix my signature.

AXEL T. JACOBSSON.